Figure 1:
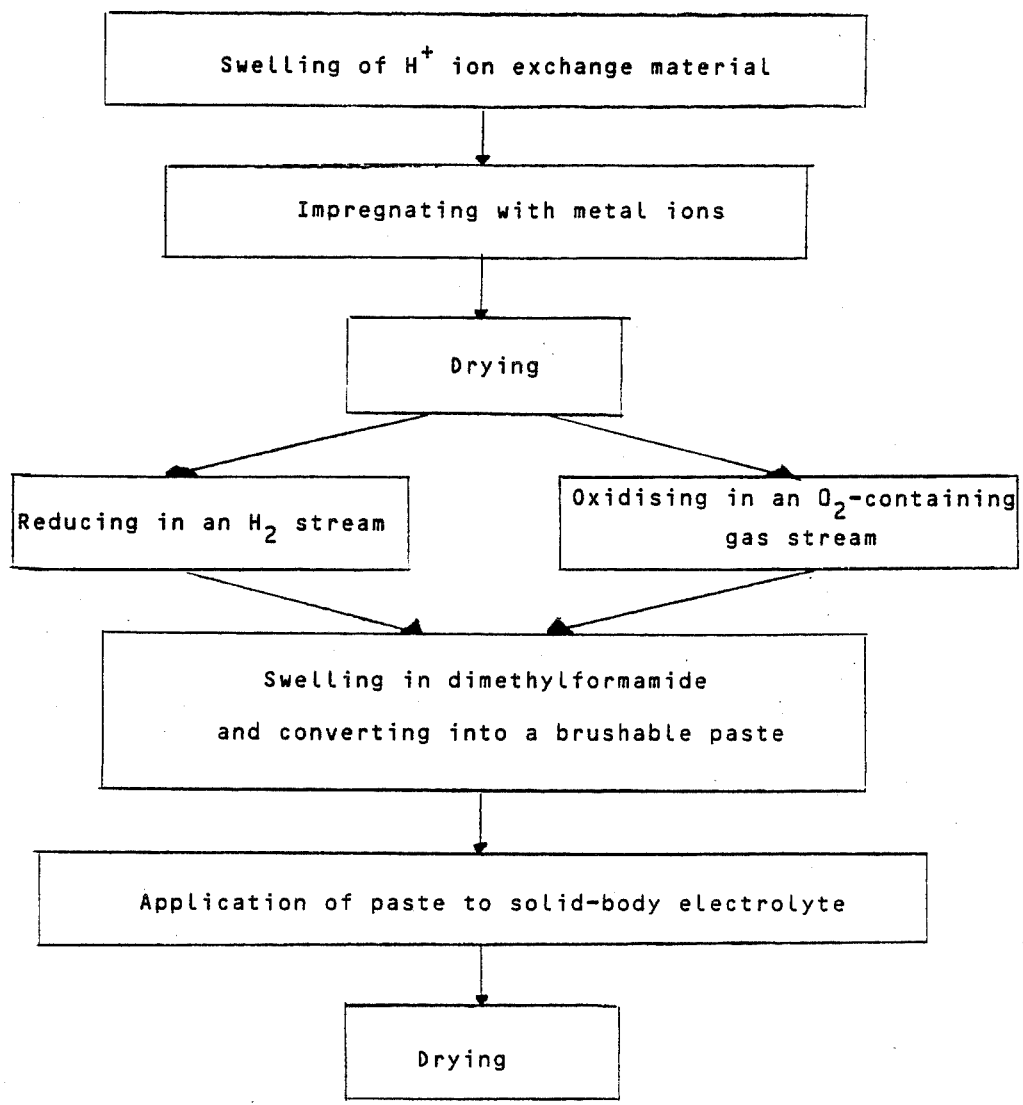

United States Patent [19]

Killer et al.

[11] Patent Number: 4,546,010
[45] Date of Patent: Oct. 8, 1985

[54] PROCESS FOR PRODUCING AN ELECTRICALLY CONDUCTIVE LAYER ON THE SURFACE OF A SOLID-BODY ELECTROLYTE, AND ELECTRICALLY CONDUCTIVE LAYER

[75] Inventors: Eric Killer, Wettingen; Günther Scherer, Gebenstorf; Samuel Stucki, Baden, all of Switzerland

[73] Assignee: BBC Brown, Boveri & Company, Limited, Baden, Switzerland

[21] Appl. No.: 578,679

[22] Filed: Feb. 9, 1984

[30] Foreign Application Priority Data

Feb. 25, 1983 [CH] Switzerland .................. 1069/83

[51] Int. Cl.$^4$ .............................................. C25B 11/00
[52] U.S. Cl. ........................................ 427/96; 204/282; 252/514; 252/518; 427/123; 427/126.5
[58] Field of Search ................ 427/126.5, 123.96; 204/282; 252/514, 518

[56] References Cited

U.S. PATENT DOCUMENTS

| | | | |
|---|---|---|---|
| 4,250,013 | 2/1981 | Carlin | 204/282 |
| 4,319,969 | 3/1982 | Oda et al. | 427/126.5 |
| 4,421,579 | 12/1983 | Covitch | 156/242 |

Primary Examiner—John D. Smith
Attorney, Agent, or Firm—Oblon, Fisher, Spivak, McClelland & Maier

[57] ABSTRACT

An electrically conductive layer on a solid-body electrolyte (1) is produced by swelling and impregnating an organic ion exchange material (2) with a metal salt solution, drying, converting the metal ions in a gas stream to finely distributed particles (3) which are in electrical contact with one another, renewed swelling in a solvent, converting into a brushable paste and applying same to the surface of the solid-body electrolyte and drying. Preferred embodiment: solid-body electrolyte (1) and ion exchange material (2) made of polymers containing sulphonic acids; and conductive particles (3) made of platinum metals or oxides thereof, in particular ruthenium as electrocatalyst.

7 Claims, 2 Drawing Figures

PROCESS FOR PRODUCING AN ELECTRICALLY CONDUCTIVE LAYER ON THE SURFACE OF A SOLID-BODY ELECTROLYTE, AND ELECTRICALLY CONDUCTIVE LAYER

The invention starts from a process for producing an electrically conductive layer, belonging to the category of the preamble of claim 1, and from an electrically conductive layer belonging to the category of the preamble of claim 8.

Electrochemical cells which make use of a solid-body electrolyte in the form of an ion exchange membrane made of a plastics polymer are distinguished by the fact that the electrodes must be applied on both sides of this membrane and must remain in intimate contact therewith. Owing to the corrosion stability which is required and the thermodynamic stability of the chemical system, the actual electrodes are made of noble metals and/or compounds thereof, which usually also act as catalysts. To ensure mass transport at the electrolyte electrode phase boundary the electrodes must have a porous construction. For economic reasons the amount of noble metal used is kept as low as possible and is applied to the solid-body electrolyte as finely distributed as possible. It is therefore obvious that the technology of coating membranes in the manufacture of porous electrodes is of supreme importance in this context.

Of the various coating methods, there may be mentioned the following:
- Hot-pressing a sintered mixture of polytetrafluoroethylene and catalyst powder onto the ion exchange membrane (U.S. Pat. No. 3,297,484).
- Chemical, or electrochemical, deposition of the catalyst at the phase boundary of the membrane (H. Takenaka et al, Proc. 3rd World Hydrogen Energy Conference, Tokyo 1980, Vol. 1, P. 107; U.S. Pat. No. 4,326,930).
- Conversion of the ion exchange membrane from the acid form into the sulphonyl chloride form by treatment with phosphorous pentachloride or phosphorous oxychloride, or conversion into the ammonium form by treatment with a ternary amine or a quaternary ammonium base. Unlike the acid form the converted forms of the membrane material are thermoplastic and can be further processed using the respective techniques, sprinkling and rolling or pressing the electrocatalytically active powder onto or into the thermoplastic mass of the membrane (DE-A-3,036,066).

Said methods require considerable expense on apparatus in the form of presses, chemical and electrolytical installations and the like, the expenditure being higher the larger the ion exchange membrane area to be coated. Moreover, certain methods are not easily applicable to any desired electrocatalysts. There is therefore a need for new inexpensive coating processes.

It is the object of the invention to specify a coating process for producing with minimal expenditure on apparatus an electrically conductive layer on the surface of a solid-body electrolyte present in the form of a largearea ion exchange membrane while minimising the consumption of expensive noble metals, of which electrode materials and the electrocatalyst are to be made, and maximising their utilisation by virtue of optimal distribution and structure in the surface of the solid-body electrolyte.

This object is achieved by the features given in the characterising clause of claims 1 and 8.

Figure 2:
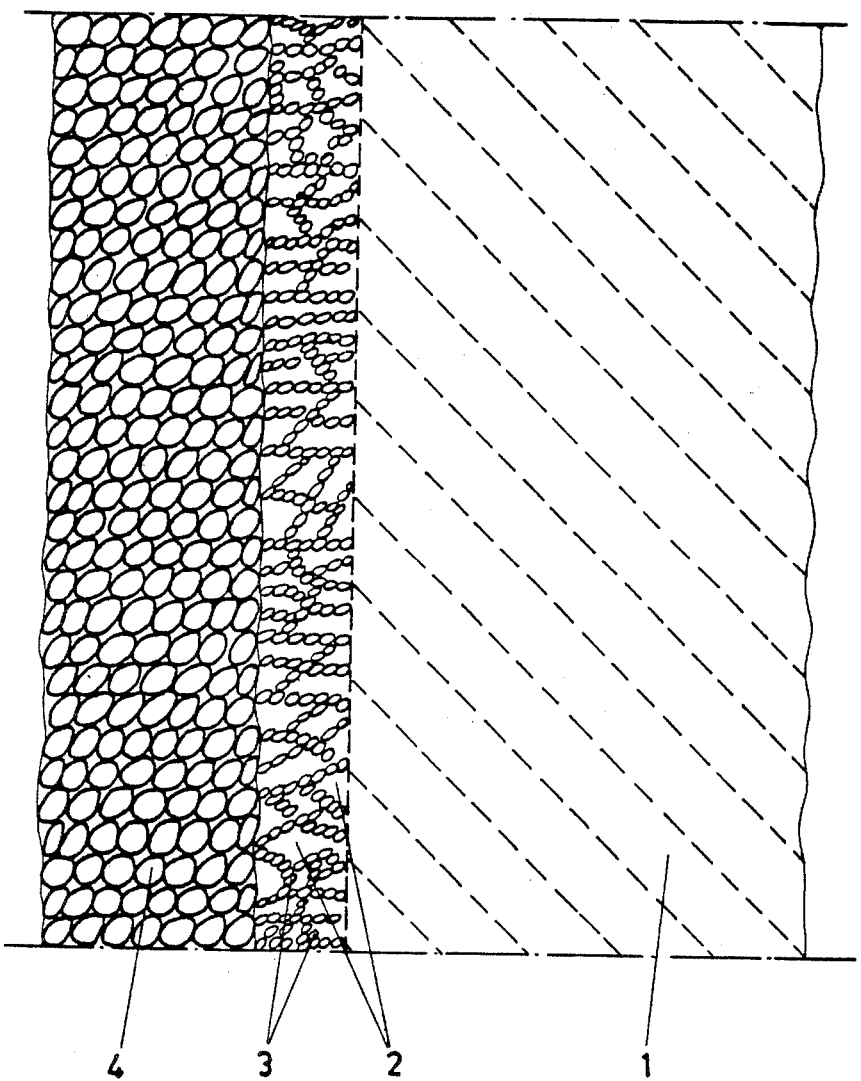

The invention is described by reference to the following embodiments illustrated in Figures, of which
FIG. 1 shows the flow diagram of the process in block form; and
FIG. 2 shows an electrically conductive layer produced using the process on the surface of a solid-body electrolyte.

FIG. 1 shows the flow diagram of the process for producing an electrically conductive layer on a solid-body electrolyte for the example of impregnating an ion exchange material, reducing in a flow of $H_2$, and swelling in dimethylformamide. The diagram is self-explanatory.

FIG. 2 depicts an electrically conductive layer produced using the process, together with the material components adjacent to it. The solid-body electrolyte 1, can take, for example, the form of a sheet (membrane) made of an ion exchange material. This ion exchange material is preferably made of a polymer in which sulphonic acids are the ion-exchanging groups. An electrically non-conductive organic ion exchange material 2 so to speak, forms the matrix of the electrically conductive layer. In it are embedded, in a state of fine distribution, all particles 3 in conductive contact with one another. The metal particles 3 preferably have a diameter of 1 to 50 nm and an average spacing of 1 to 10 nm, the density per area of the coating being about 0.01 to 1 mg/cm$^2$. The porous electrically conductive current collector designated reference character 4 is chemically inert under the prevailing conditions, i.e. is corrosion-resistant, and liquid- as well as gas-permeable.

The invention relies on the property of many organic solid-body electrolytes (polymers acting as ion exchange materials) of having solvated regions capable of absorbing metal ions. The favourable configuration and dimension of these regions, "channels", for the transport of ions in these membranes is utilised. The phenomenon permits advantageous tuning of the geometry at the electrolyte (membrane)/electrode (electrocatalyst) interface. The intention is thus to replace some of the solvated regions of the interface with metal particles which are in close conductive contact with one another and in this way form a network penetrating the interface. As a result, the amount of electrocatalyst material in the form of noble metal which is required for satisfactory functioning can be considerably reduced and its effectiveness in operation increased. The concentration of the metal ion solution used in impregnating the ion exchange material can be adjusted in a controlled manner, so that it is possible to obtain the most suitable geometry between ion exchange matrix and metal particles present in the end. In this way the cluster structure of the organic polymer acting as ion exchange material is utilised in order to generate the electrocatalyst particles with similar dimensions within the polymer structure.

The intimate mixing of ion exchange material 2 with the network of metal particles 3 provides excellent conditions in the interface where the electrochemical reactions are to take place.

In the present process, then, this heterogeneous mass consisting of ion exchange material 2 and particles 3 is swollen in an organic polar solvent (dimethylformamide, dimethylacetamide, propanol, or methyl or ethyl alcohol) and converted into a brushable paste which can in turn be applied to the solid-body electrolyte 1 to be coated. The paste can be applied by brushing, grouting or screen-printing.

Prime candidate for use as ion exchange material 2 is a polymer having sulphonic acids as ion-exchanging groups. The solid-body electrolyte 1 can be made of the same or a similar material. The solution used for the impregnating can contain ions of one or more platinum metals, preferably platinum itself or a mixture of ruthenium/iridium. The metal salt can be for example in the form of a chloride (ruthenium chloride $RuCl_3$), the liquid used for the first swelling of the ion exchange material 2 can be ethanol, and the solvent for the chloride can likewise be ethanol. A reducing gas stream, for example an $H_2$ stream, can be used for reducing the metal salt ions to elemental metal particles 3. The temperature of the gas stream: 50° to 250° C.

Illustrative embodiment I

See FIGS. 1 and 2:

An ion exchange material of the type made of perfluorinated polymer with sulphonic acids (trade name "Nafion 1100" from Du Pont) was swollen at 80° C. in ethanol, and a saturated alcoholic solution of ruthenium chloride ($RuCl_3$) was added. The plastics polymer thus swollen and impregnated with the noble metal salt was dried and then exposed at 150° C. to a reducing atmosphere (hydrogen stream) for 60 minutes, during which the ruthenium ions were reduced to metallic particles of elemental ruthenium having an average diameter of about 5 nm. These ruthenium particles embedded in the substrate material were detectable under the electron microscope. After renewed swelling and dissolving of the substance thus obtained in dimethylformamide at 150° C. under a pressure of 7 Mpa a brushable paste was produced and applied to an ion exchange membrane of the "Nafion" type. This layer firmly adhered to the substrate and, after evaporation of the solvent, had an average thickness of about 50 $\mu$. In this way it is possible to produce layer thicknesses of about 10 to 10$\mu$ (ion exchange material 2 plus metal particles 3).

Illustrative embodiment II:

See FIGS. 1 and 2:

The ion exchange material in the form of polymer granules was swollen in ethanol and treated with a solution of $RuCl_3$, both steps being carried out as described in Example I. Thereupon the dried powder thus prepared was exposed at 190° C. to an oxidising atmosphere (air stream) for 3 hours. As a result, ruthenium oxide particles having an average diameter of 10 nm were formed in the ion exchange matrix. The remainder of the process took the same form as in Example I.

The various process steps of swelling, impregnating (exchanging H ions for metal ions), and chemical reacting (reducing or oxidising) can also be carried out several times in succession. In this way the content of metalretaining particles in the surface layer of the polymer can be adjusted in a controlled manner according to need.

We claim:

1. A process for producing an electrically conductive layer on the surface of a solid-body electrolyte (1) characterised in that an organic ion exchange material (2) is swollen in a liquid, is impregnated with a solution of metal ions, is dried, and is exposed to a reactive atmosphere in a gas stream at a temperature of 50° to 250° C., as a result of which the metal ions are converted into finely distributed particles (3) which are in electrical contact with one another, in that the ion exchange material (2) thus doped is swollen in an organic polar solvent, and is converted into a brushable paste which is applied to the surface of the solid-body electrolyte (1) by brushing or screen printing and dried.

2. A process according to claim 1, characterised in that the reactive atmosphere is reducing and contains hydrogen.

3. A process according to claim 1, characterised in that the reactive atmosphere is oxidising and contains oxygen.

4. A process according to claim 1, characterised in that the organic ion exchange material (2) consists of a polymer having suphonic acids as ion-exchanging groups and in that the solution used for the impregnating contains ions of one or more platinum metals.

5. A process according to claim 4, characterised in that the platinum metal is platinum.

6. A process according to claim 4, characterised in that the platinum metals consist of a mixture of ruthenium and iridium.

7. a process according to claim 1, characterised in that not only the solid-body electrolyte (1) to be coated but also the ion exchange material (2) used for the coating consists of a polymer having sulphonic acids as ion-exchanging groups.

* * * * *